United States Patent [19]

Cottin et al.

[11] 4,317,582
[45] Mar. 2, 1982

[54] PROTECTIVE DEVICE FOR THE OCCUPANTS OF A MOTOR VEHICLE

[75] Inventors: Claude Cottin, Suresnes; Bernard Le Veux, Vauhallan, both of France

[73] Assignee: Regie Nationale des Usines Renault, Boulogne-Billancourt, France

[21] Appl. No.: 114,396

[22] Filed: Jan. 23, 1980

[30] Foreign Application Priority Data

Jan. 23, 1979 [FR] France ................... 79 01583

[51] Int. Cl.³ ............................................ B60R 21/02
[52] U.S. Cl. ........................................ 280/751; 180/90
[58] Field of Search .............. 280/751, 752, 748, 747, 280/750; 180/90, 89.1

[56] References Cited

U.S. PATENT DOCUMENTS 2,072,655  3/1937  Tjaarda .......................... 280/748 X
2,833,554  5/1958  Ricordi .......................... 280/751
3,947,056  3/1976  Schwanz ........................ 180/90

Primary Examiner—Robert R. Song
Assistant Examiner—Milton L. Smith
Attorney, Agent, or Firm—Oblon, Fisher, Spivak, McClelland & Maier

[57] ABSTRACT

An occupant protection device for holding back the lower body portion, i.e., knees and pelvis, of an occupant of a veicle during a crash, including a plastically stretchable hollow sheet metal girder structure on opposite sides of the vehicle, secured in spaced relation to the panel separating the passenger compartment from the forward part of the vehicle by a frame supported on the panel, and including a linkage coupling the structure on opposite sides of the vehicle for effective force distribution between the vehicle sides and separating panel.

7 Claims, 7 Drawing Figures

PROTECTIVE DEVICE FOR THE OCCUPANTS OF A MOTOR VEHICLE

BACKGROUND OF THE INVENTION

Field of the Invention

This invention involves a knee protection device which holds back the pelvis of occupants in the passenger space of a motor vehicle. The device extends transversely on both sides of the lengthwise plan of the vehicle and at a specific distance away from it.

This invention involves in particular a linkage structure for such knee protection devices when they are separated by components of the chassis of the vehicle, as in the case of a steering shaft or a dash board.

The protective device of the invention is connected or linked to stakes or panels on opposite sides of the body, on both sides of the device, and conveys the lengthwise stress which is applied to it to the stakes and to the separation panel between the forward structure of the vehicle and the passenger space.

More specifically, the lateral bases of the protective device are attached to support feet or brackets linked to one another across the space between opposite sides of the passenger compartment and respectively supported on the separation panel between the forward structure of the vehicle and the passenger space. The sections of the protective device on opposite sides of the passenger compartment are linked to one another by a crossbar positioned between the two modular spaces.

Thus implemented, the device guarantees the correct hold back of the vehicle occupants' knees, when the arrangement of the median section of the passenger space forbids the use of a protective device which would extend without interruption between two lateral panels in this passenger space.

SUMMARY OF THE INVENTION

It is therefore a principal object of the invention to provide a structure for protecting occupants of a vehicle, wherein sections of a protection device on opposite sides of the vehicle are arranged to stop forward travel of the knees and pelvis of the occupants in the event of an accident, and the sections are coupled or linked together across the space between the compartments to achieve effective force distribution.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
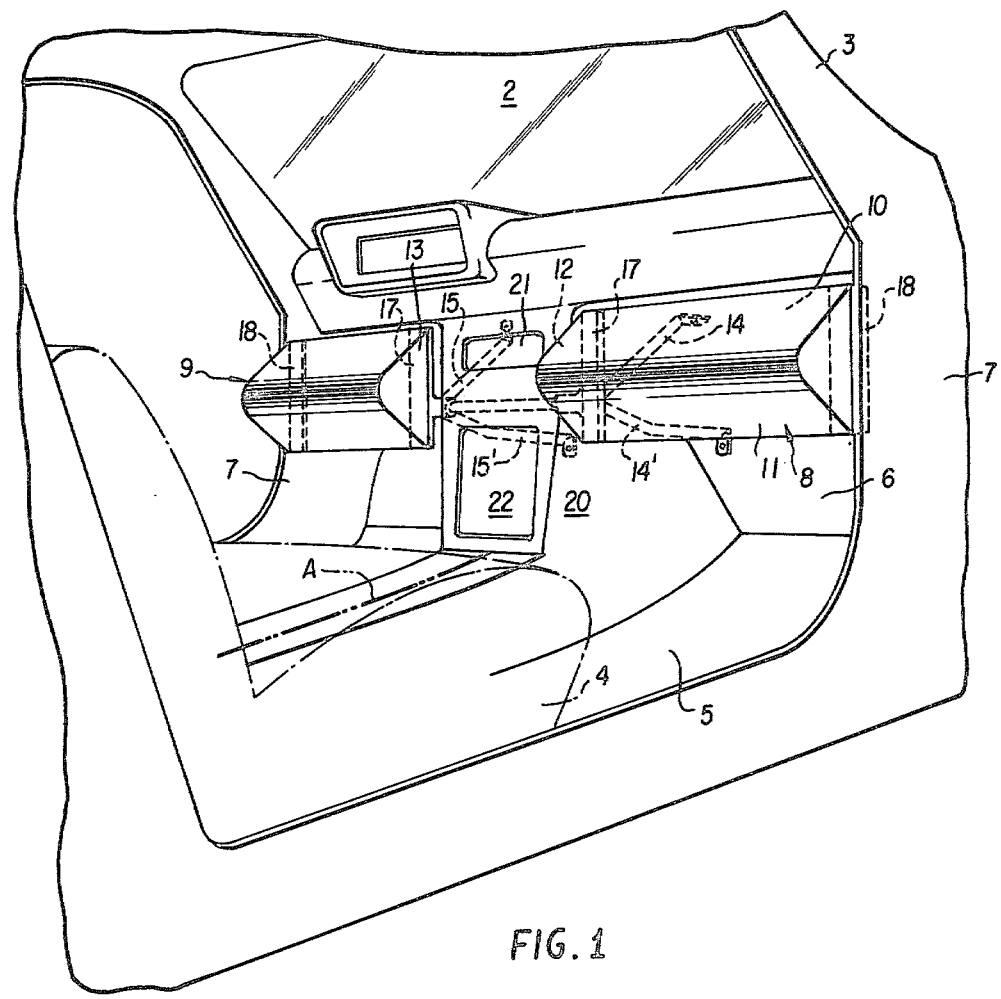
FIG. 1 is a schematic illustration of a vehicle passenger space equipped with the device in conformity with the invention.
Figure 2:
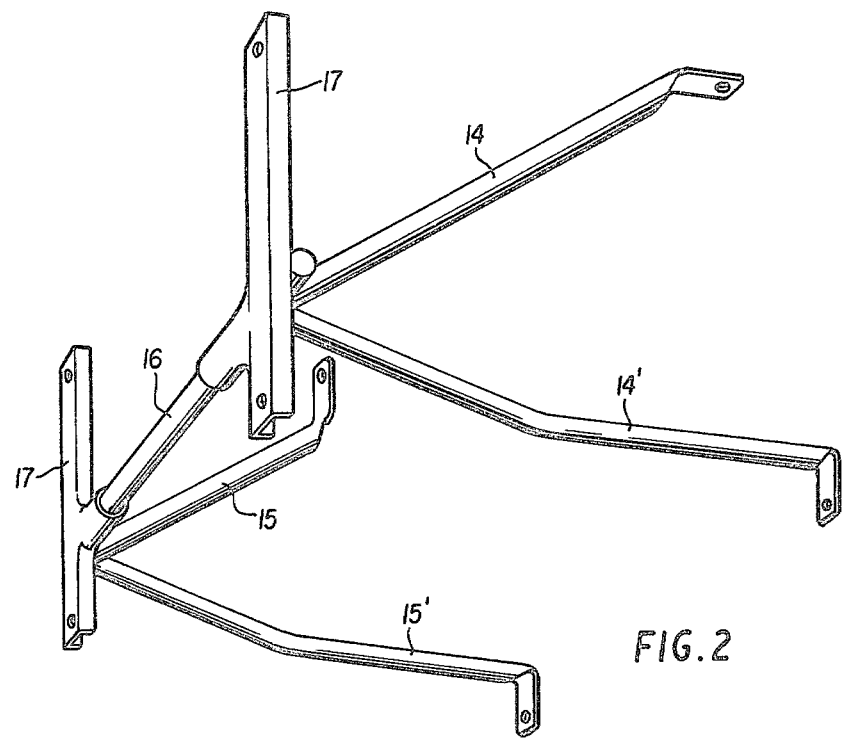
FIG. 2 is a view in perspective of the support feet or brackets of the device, and the linking coupling section.
Figure 3:
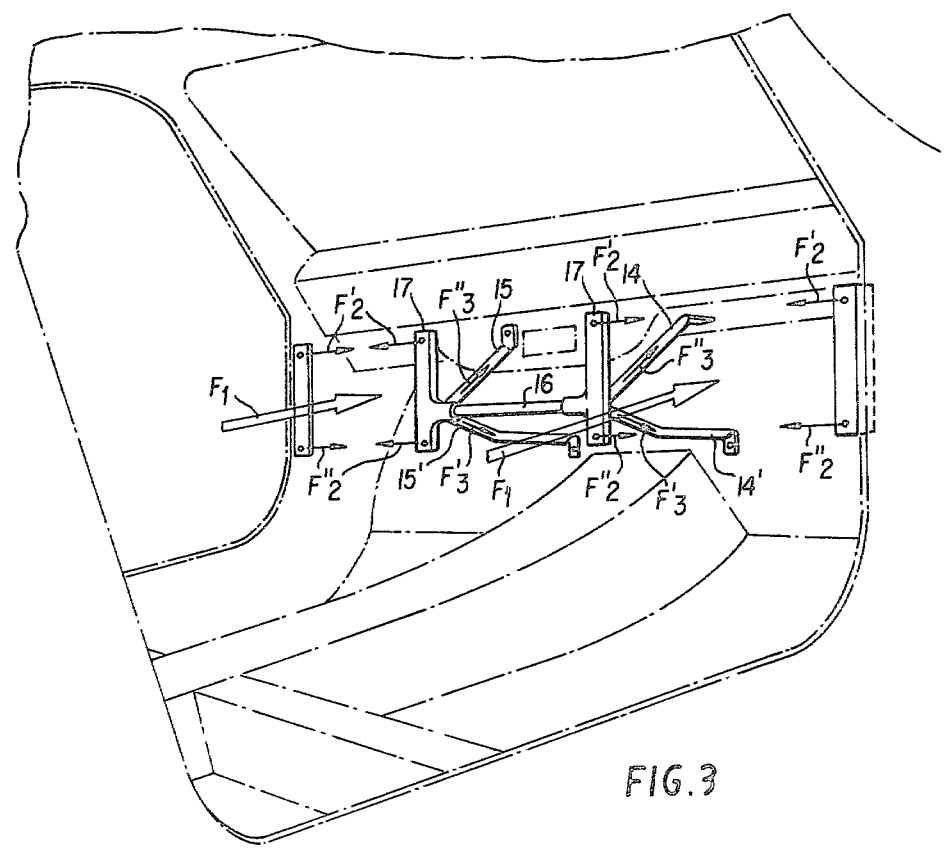
FIG. 3 shows the allocation of stress throughout the device.
Figure 4:
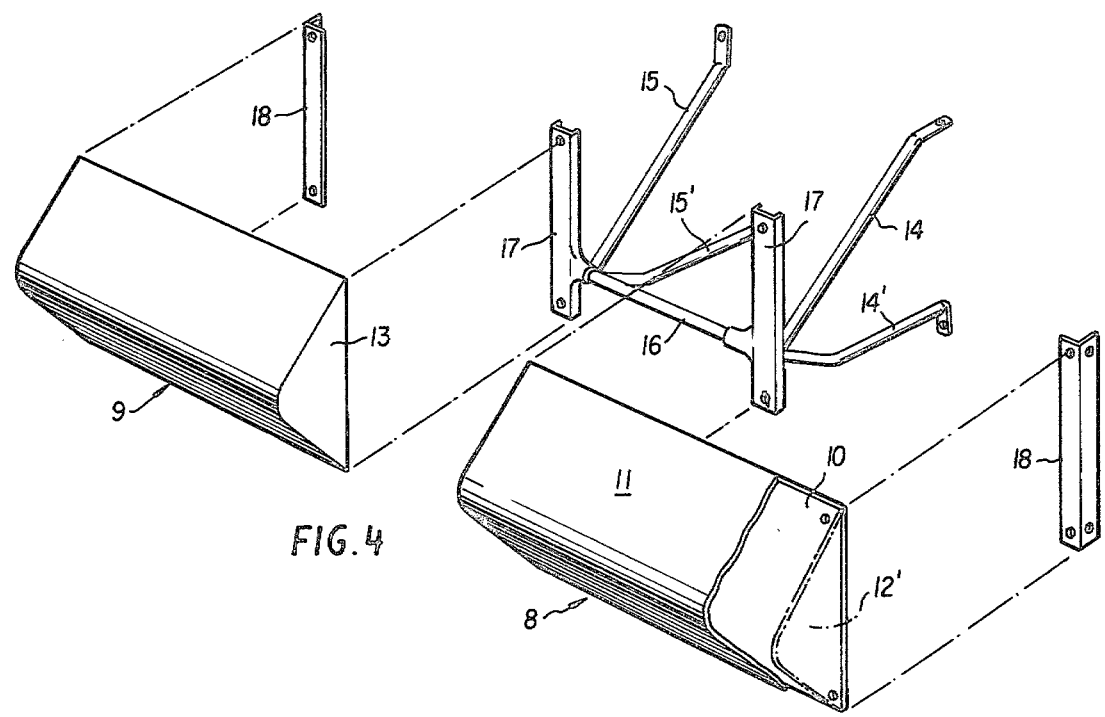
FIG. 4 is an exploded perspective of the major components of the invention.
Figure 5:
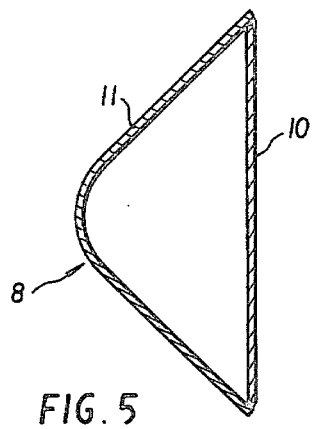
FIG. 5 is an end view in section of one of the modules of the device.
Figure 6:
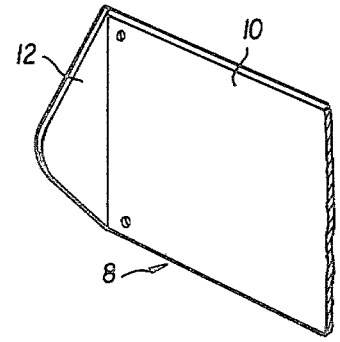
FIG. 6 is a fragmentary perspective view, with portions broken away, of a part of one of the sections or modules.

The protective device shown in FIG. 1 is mounted in the passenger space 2 of a body 3 of a motor vehicle. The vehicle occupant seated on a seat 4 can be held back by a two anchorage, roller-equipped passive belt, not shown, of which the upper lateral anchorage is affixed to the floor 5 of the vehicle. Such a belt is well known and needs no further detailed description.

The protective device placed at the level of the occupant's knees and pelvis is attached to the sheet metal 6 which constitutes the separation panel between the forward structure of the vehicle and the passenger space. The device is also attached to side stakes or panels 7 between which it extends crosswise on both sides of the lengthwise plan (A) of the vehicle.

The device includes essentially two sheet metal units 8, 9, each of which consists of an initial metal sheet 10 with fastening holes for gussets and a second metal sheet 11 welded to the initial one 10. The sheets 10 and 11 define a plastically stretchable hollow girder following a thrust effort $F_1$ communicated to the device by the shock of the occupants' knees in the seat 4 after an accident. One implementation mode for such a girder is revealed in French patent application No. 78.18358 filed on June 20, 1978 on behalf of the applicant.

In conformity with the invention, the side bases or ends 12 and 13 of the sheet metal units 8 and 9 adjacent the longitudinal center of the vehicle are associated with a unit of support feet or brackets 14, 14' and 15, 15' which are divided into two groups placed at the tips or ends of a crossbar 16 and which are supported on the separation panel 6.

Each end of the crossbar 16 bears a junction wing or bracket 17, on which are respectively mounted one end of each of the sheet metal units 8 and 9, and the latter are connected at their other ends by a gusset 18 with the corresponding side stake or panel 7.

Thus implemented, the device allows the linking or coupling of the side stakes or panels 7 by way of units 18, 8, 17, 16, 17, 9 and 18, which constitute a force transmission linkage.

Indeed, the thrust effort $F_1$ applied to the sheet metal unit 8 and/or 9 is broken down into a tractive or tensile force vector $F_2$ and a compression force vector $F_3$.

The tractive force $F_2$ is conveyed by the two junction wings 17, by way of the gussets 18, to the side stakes 7.

The compression force $F_3$ is conveyed by the support feet or brackets 14, 14' and 15, 15' to the sheet metal 6 which acts as a separation panel between the forward part of the vehicle and the passenger space.

The crossbar 16 and the support feet 14, 14' and 15, 15' are hidden from the view of occupants by a corbel 20 which extends above and below the crossbar as shown in FIG. 1. However, the junction wings 17 are kept free on each side of the corbel to facilitate the assembly or disassembly of the units 8, 9.

It can be seen that the device in conformity with the invention allows the assembly accessories inside the casings 21, 22 of the corbel 20 without altering the esthetics of the passenger space.

Figure 7:
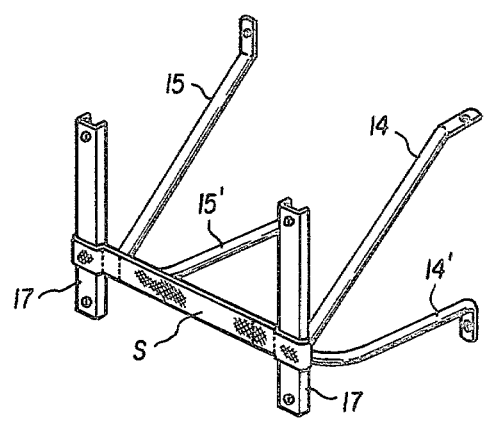
FIG. 7 is a fragmentary perspective view of a modification of the linkage means.

Within the scope of the invention, it should be noted that the crossbar 16 can be a rigid (metal or synthetic section) or flexible unit (wire, straps etc, FIG. 7) stretched between the junction wings 17, where the latter can be integrated into the units 8, 9 with their fastening feet or brackets.

The dimensional features of the crossbar make it possible to cross link units 8, 9 in spite of the presence of accessories in the corbel 20, such as heating, radio, ash tray, controls, and the like.

Obviously many modifications and variations of the present invention are possible in light of the above teachings. It is to be understood therefore that within the scope of the appended claims this invention may be practiced otherwise than as specifically described herein.

What is claimed as new and intended to be covered by Letters Patent is:

1. A knee protection device for holding back the lower body portion of an occupant of a vehicle passenger space in the event of an accident, comprising:
    a yieldable structure extending cross-wise of the passenger space between the passenger space and the forward part of the vehicle;
    said yieldable structure including two separate sections supported by side panels of the vehicle on opposite sides of the longitudinal center line of the vehicle;
    a frame also supporting said sections and including support feet extending forwardly into supported relationship with a separating panel of the vehicle separating the passenger space from the forward portion thereof, said frame including linkage means coupling portions of the frame at opposite sides of the vehicle, whereby the force of impact caused by the knees of an occupant striking the yieldable structure is transmitted and distributed between the opposite side panels and said separating panel.

2. A device according to claim 1, characterized in that: the linkage means comprises a crossbar; and the support feet are divided into two groups at the ends of the crossbar.

3. A device according to claim 2, characterized in that: the yieldable structure comprises a pair of hollow sheet metal sections defining transversely extending, plastically stretchable hollow girders at the front of each side of the passenger space; and a junction wing is carried on each end of the crossbar, said girders being secured at their adjacent ends to the wings and at the other ends to the vehicle side panels.

4. A device according to claim 3, characterized in that: the junction wings are located on both sides of a dashboard corbel which is above and below the crossbar.

5. A device according to claim 4, characterized in that: the crossbar extends to the vicinity of accessories located inside the dashboard corbel.

6. A device according to claim 4, characterized in that: the crossbar is a rigid unit stretched between the junction wings.

7. A device according to claim 4, characterized in that: the crossbar is a flexible unit stretched between the junction wings.

* * * * *